United States Patent Office 3,093,272
Patented June 11, 1963

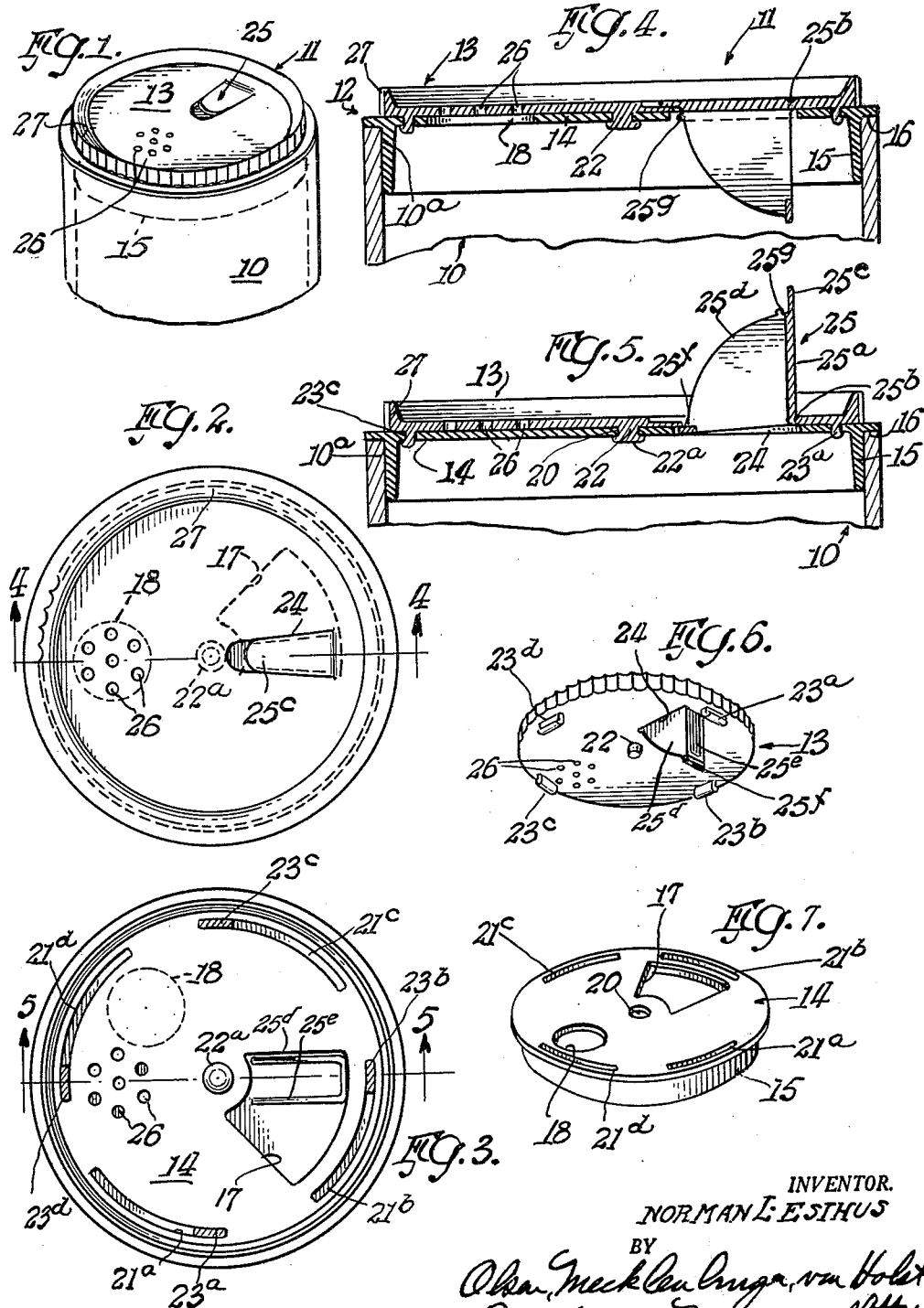

3,093,272
DISPENSING APPARATUS
Norman L. Esthus, Arlington Heights, Ill., assignor to Morton Salt Company, Chicago, Ill., a corporation of Illinois
Filed Aug. 30, 1960, Ser. No. 52,888
3 Claims. (Cl. 222—480)

This invention relates to a dispensing apparatus and more particularly to an apparatus suitable for dispensing table salt, flour, sugar, or the like.

Various apparatus of this type have heretofore been proposed but, because of design, are beset with one or more of the following shortcomings: (a) are of a complex and costly construction; (b) are awkward to manipulate; (c) are readily susceptible to clogging by the material being dispensed; and (d) are not capable of withstanding repeated use.

Thus, it is one of the objects of this invention to provide an improved dispensing apparatus which overcomes the aforementioned shortcomings.

It is a further object of this invention to provide an apparatus which may be readily assembled on a container.

It is a still further object of this invention to provide an apparatus which is of sturdy, compact construction, attractive in appearance, and efficient in operation.

Further and additional objects will appear from the description, accompanying drawings and appended claims.

In accordance with one embodiment of this invention, a dispensing apparatus is provided which is adapted to dispense a granulated material through a single large opening or through a plurality of small perforations. The apparatus, in this instance, includes an apertured disc-shaped first member which is adapted to overlie the open end of a container and be secured thereto. The first member is provided with an elongated arcuate aperture having the center of curvature thereof coaxial with the transverse center axis of said first member. The first member is also provided with a second aperture angularly spaced from the first aperture. Mounted for limited rotary movement on, and secured to, the first member and in superimposed relation therewith is an apertured disc-shaped second member. The second member is provided with a first opening which is disposed in continuous registered relation with the arcuate-shaped first aperture of the first member. Hingedly secured to a portion of the second member, circumjacent the first opening, is a pouring spout which, when in one position of adjustment, is adapted to overlie and close off the first opening. The second member is provided with a plurality of perforations arranged in a group which is angularly spaced from the first opening. The plurality of perforations are all in registration with the second aperture of the first member only when the second member is in one predetermined position of rotational adjustment.

For a more complete understanding of this invention, reference should be made to the drawing, wherein:

FIGURE 1 is a fragmentary perspective view of the improved dispensing apparatus shown mounted on the open end of a container;

FIG. 2 is an enlarged top plan view of FIG. 1, with the second member at one terminus of its limited rotary movement, wherein the plurality of perforations of the second member are in registered relation with the second aperture of the first member;

FIG. 3 is similar to FIG. 2, but in cross-section and with the second member in a second terminus of its limited rotary movement; the section plane being flush with the top surface of the first member;

FIG. 4 is an enlarged sectional view taken along line 4—4 of FIG. 2;

FIG. 5 is an enlarged sectional view taken along line 5—5 of FIG. 3 and showing the pouring spout in its open position;

FIG. 6 is a perspective view of the underside of the second member when in disassembled relation; and FIG. 7 is a perspective view of the upper side of the first member when in disassembled relation.

Referring now to the drawings and, more particularly, to FIG. 1, a cylindrically-shaped open-end container 10 is shown which is of a type suitable for holding table salt, sugar, flour, or the like. Mounted in overlying relation on the open end 10a of the container is an improved dispensing apparatus 11. The container 10 may vary in size and shape from that shown but, preferably, should be of such a configuration that it may be readily manipulated by hand, so as to dispense the contents from the container either by pouring through a single large opening or by sifting through a plurality of perforations.

The dispensing apparatus 11, in this instance, comprises two complementary members 12 and 13. Member 12 is preferably of a molded relatively stiff plastic material and disc-shaped. Member 12 has a flat upper surface 14 and an annularly-shaped flange 15 depending from the underside thereof. The flange 15 is spaced inwardly a slight amount from the periphery of surface 14 so as to form a shoulder 16 against which the open end 10a of container 10 is adapted to bear (see FIGS. 4 and 5). The depending flange 15 may be secured by any suitable means, such as adhesives or the like, to the interior surface of container 10. Top surface 14 of member 12 is provided with an elongated arcuate-shaped, or circular ring sector shaped first opening 17 which has the center of curvature thereof coincident with the transverse center axis of member 12. Angularly spaced from and disposed on substantially the opposite side of the transverse center axis is a second opening 18. The function of these two openings 17 and 18 will become apparent from the discussion to follow hereinafter. Symmetrically disposed about, and adjacent to, the periphery of surface 14 are a plurality of thin, elongated, arcuate-shaped slots 21a, 21b, 21c and 21d. Each of the slots is substantially the same length and has the center of curvature thereof coincident to the transverse axis of member 12. A small opening 20 is provided at the center of surface 14 and such opening 20 has the central axis thereof coincident to the transverse center axis of member 12.

Member 13 is preferably formed of a molded, relatively pliable, plastic material and, as seen more clearly in FIG. 6, is provided with a center depending stud 22 which is adapted to be frictionally accommodated in opening 20 of member 12. The end 22a of the stud which projects beyond opening 20 is peened over, or enlarged, as shown, so as to effect interlocking of members 12 and 13. In addition, there is provided, adjacent the outer periphery of member 13, a plurality of symmetrically arranged depending lugs 23a, 23b, 23c, and 23d, which are adapted to be slidably accommodated in corresponding slots 21a–d formed in member 12. The lower end 24 of each lug is offset laterally a slight amount, as shown in FIG. 5, so as to effect a snap-in engagement with the slot. The length of each of the slots 21a–d, as aforementioned, is the same and determines the limits to which member 13 may be rotated relative to member 12 in either a clockwise or counter-clockwise direction. Member 13 is provided with an enlarged opening 24, which is adapted to remain in continuous registered relation with arcuate opening 17 of member 12, regardless of the position of rotational adjustment of member 13.

Hingedly mounted on a portion of member 13, circumjacent opening 24, is a spout piece 25 which is provided with a base portion 25a and a pair of quadrantal-shaped side elements 25d and 25e projecting in substantially the same direction from opposite peripheral sides of said base portion, as seen more clearly in FIG. 5. One end 25b of base portion 25a, in this instance, is integrally connected to the circumjacent portion of member 13 and provides the axis about which element 25 hinges. The opposite end 25c of base portion 25a protrudes beyond the periphery of opening 24 and forms a finger tab to facilitate manipulating the element to its open position, such as shown in FIG. 5.

The side elements 25d and 25e are adapted to frictionally engage the periphery of opening 24 and cooperate with base portion 25a to provide a suitable pouring spout when element 25 is disposed in its open position. The lower edge portion of side elements 25d and 25e are interconnected by a bridging segment 25f which functions as a stop when the element is in its fully open position (see FIG. 5). Either side element 25d or 25e or both are provided with a protuberance 25g which is spaced from, but close to, tab 25c and is adapted to cooperate with the latter and the periphery of opening 24 to effect locking of the element 25 in its closed position, such as shown in FIG. 4.

Angularly spaced from opening 24 are a plurality of perforations 26 which are formed on member 13. The perforations 26 are arranged in close proximity to one another so as to form a group. The arrangement of the perforations 26 in the group is such that all of the perforations will be in registration with the second opening 18 of member 12 only when the members 12 and 13 are in the relative position shown in FIG. 2. When the members 12 and 13 are in the relative position shown in FIG. 2, and spout piece 25 is in its closed position, the contents of the container may be dispensed therefrom by way of sifting.

The periphery of member 13 is provided with an upwardly extending flange 27 which has the outer surface thereof knurled or serrated, so as to facilitate rotational manipulation of member 13 in either a clockwise or counter-clockwise direction with respect to member 12. As aforenoted, both members 12 and 13 may be readily molded, thereby minimizing the cost of such apparatus. In the case of member 13, the spout element 25 may be molded simultaneously with the remainder of the member.

In a modified form of dispensing apparatus, not shown, the first and second openings 17 and 18 of member 12, may be combined into a single opening, in which case the angular spacing between the opening 24 and the group of perforations 26 of the outer disc-shaped member 13 would be reduced and thereby effect reducing of the arcuate length of the single opening aforedescribed. With this modified form of apparatus, all of the perforations 26 would be in registration with such single opening of the inner member 12, only when the opening 24 of the outer member is disposed at one end limit of the single opening of inner member 12.

Furthermore, if desired, the peripheral lugs 23a-d of outer member 13 and the peripheral slots 21a-d of inner member 12 may be eliminated if desired and the centrally disposed stud 22 and opening 20 be relied upon to effect retention of members 12 and 13 in assembled relation. In this latter instance, the quadrantal-shaped side elements 25d and 25e of the spout piece 25 would cooperate with the periphery of opening 17 to function as a stop and limit the relative rotational movement between members 12 and 13.

Thus, it will be seen that a simple, inexpensive and efficient dispensing apparatus has been provided which may be readily mounted on a container. Furthermore, the apparatus is compact and may be readily adjusted for either sifting or pouring the contents from the container.

While several embodiments of this invention have been described above, it will be understood, of course, that the invention is not to be limited thereto, since many further modifications may be made and it is contemplated, therefore, by the appended claims, to cover any such modifications as fall within the true spirit and scope of this invention.

I claim:

1. A dispensing apparatus for use on an open-end container, said apparatus comprising a substantially disc-shaped first member mountable on such container in overlying relation with respect to the open end thereof, said first member being provided with an elongated arcuate first aperture having the center of curvature thereof coaxial with the transverse center axis of said first member, a second aperture angularly spaced from said first aperture, a third aperture disposed at said center axis, and a plurality of arcuate-shaped fourth apertures disposed adjacent the outer periphery of said first member and symmetrically arranged about said center axis, said first member having a flange element adjacent the periphery of said first member and projecting from one surface thereof for engagement with such container open end; and a substantially disc-shaped second member mounted in substantially superimposed relation on said first member for limited rotary movement with respect thereto, said second member being provided with a first opening disposed in continuous registered relation with said arcuate first aperture, and a plurality of small perforations arranged in a group which is angularly spaced from said first opening, all of said perforations being in registered relation with said second aperture only when said second member is at one terminus of its limited rotary movement; said second member including a pouring spout hingedly mounted on a portion of said second member circumjacent said first opening, said spout overlying and closing off said first opening, when in one position of hinged adjustment, a protuberance interlockingly engaging said third aperture, and a plurality of detents disposed adjacent the periphery of said second member and interlockingly and slidably engaging said fourth apertures and cooperating therewith to limit the rotary movement of said second member.

2. A dispensing apparatus for use on an open end container, said apparatus comprising a base member mountable on such container in overlying relation with respect to the open end thereof, and a cover member mounted in substantially superimposed relation with respect to said base member for limited rotary movement with respect thereto about a common transverse axis, said base member being provided with an elongated arcuate first aperture having the center of curvature thereof co-axial with said common transverse axis, and a second aperture angularly spaced from said first aperture, said cover member being provided with a first aperture, and a plurality of small apertures arranged in a group which is angularly spaced from the first aperture of said cover member, one of said members having a plurality of spaced, arcuate-shaped slots and the other member having a plurality of corresponding detents, said slots and said detents being disposed outwardly of the apertures in said members and equidistant from said common transverse axis, said detents interlocking and slidably engaging the arcuate slots in said one member and cooperating therewith to limit the relative rotary movement of said members, and means pivotally interconnecting said members at the common transverse axis, the first aperture in said cover member being disposed in continuous registered relation with the arcuate first aperture of said base member, and all of the small apertures in said cover member being in registered relation with the second aperture of said base member only when said cover member is at one terminus of its limited rotary movement, said cover member including a pouring spout hingedly mounted on a portion of said cover member circumjacent said first aperture, said spout overlying and closing off the first aperture in said cover member when in one position of hinged adjustment.

3. A dispensing apparatus for use on an open end container, said apparatus comprising a base member mountable on such container in overlying relation with respect to the open end thereof, said base member being provided with an elongated arcuate first aperture having the center of curvature thereof co-axial with the transverse center axis of said base member, and a second aperture angularly spaced from said first aperture; and a substantially disc-shaped cover member mounted in substantially superimposed relation on said base member for limited rotary movement with respect thereto, said cover member being provided with a first opening disposed in continuous registered relation with said arcuate first aperture, and a plurality of small perforations arranged in a group which is angularly spaced from said first opening, all of said perforations being in registered relation with said second aperture only when said cover member is at one terminus of its limited rotary movement, said cover member including a pouring spout hingedly mounted on a portion of said cover member circumjacent said first opening, said spout overlying and closing off said first opening when in one position of hinged adjustment, one of said members having a plurality of arcuate-shaped apertures symmetrically arranged adjacent the outer periphery thereof, the other of said members having a plurality of detents disposed adjacent the periphery thereof and in slidable engagement with the arcuate apertures in said one member and cooperating therewith to limit the relative rotary movement of said members, and means including a center aperture and interlocking protuberance at the center axis of said members for interlocking said members in superimposed relation for relative rotary movement with respect to each other.

References Cited in the file of this patent
UNITED STATES PATENTS

| | | |
|---|---|---|
| 1,959,874 | Mills | May 22, 1934 |
| 2,121,232 | Hartog | June 21, 1938 |
| 2,554,710 | Leccese | May 29, 1951 |
| 2,777,615 | De Shazor | Jan. 15, 1957 |
| 2,964,047 | Jackson et al. | Dec. 13, 1960 |
| 2,971,681 | Galbierz | Feb. 14, 1961 |

FOREIGN PATENTS

| | | |
|---|---|---|
| 26,128 | Great Britain | Nov. 10, 1910 |